Dec. 10, 1957    A. W. FEIERTAG    2,815,811
ELECTRIC CARD GROOVER
Filed Dec. 21, 1953    9 Sheets-Sheet 1
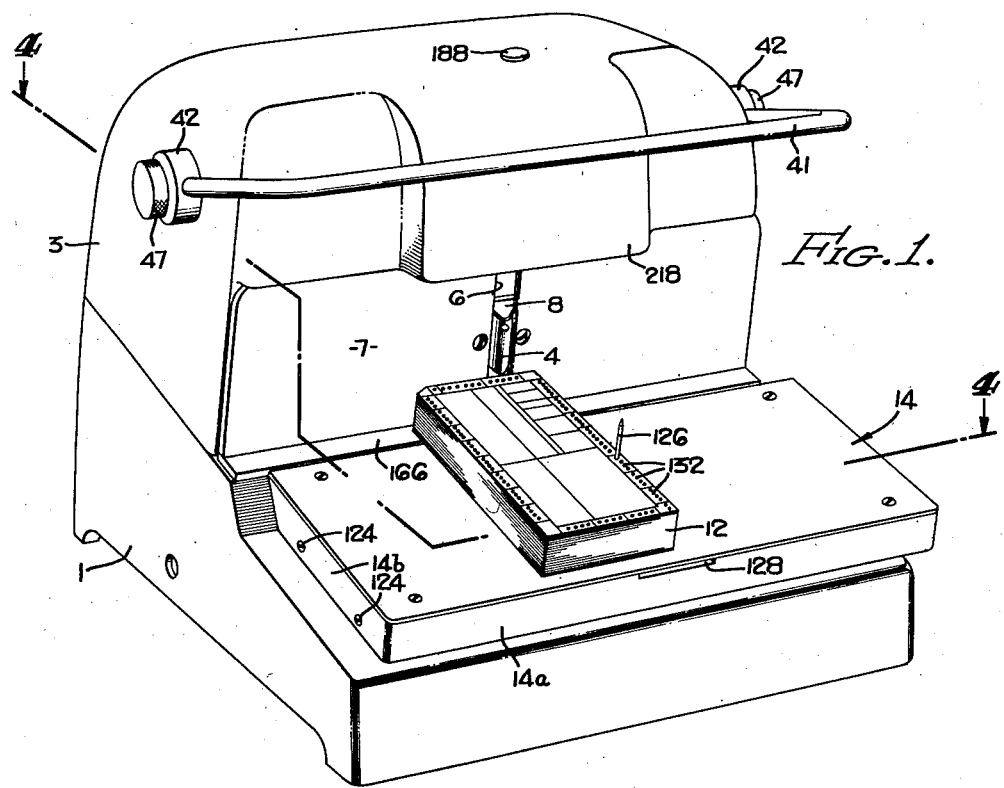
Fig.1.
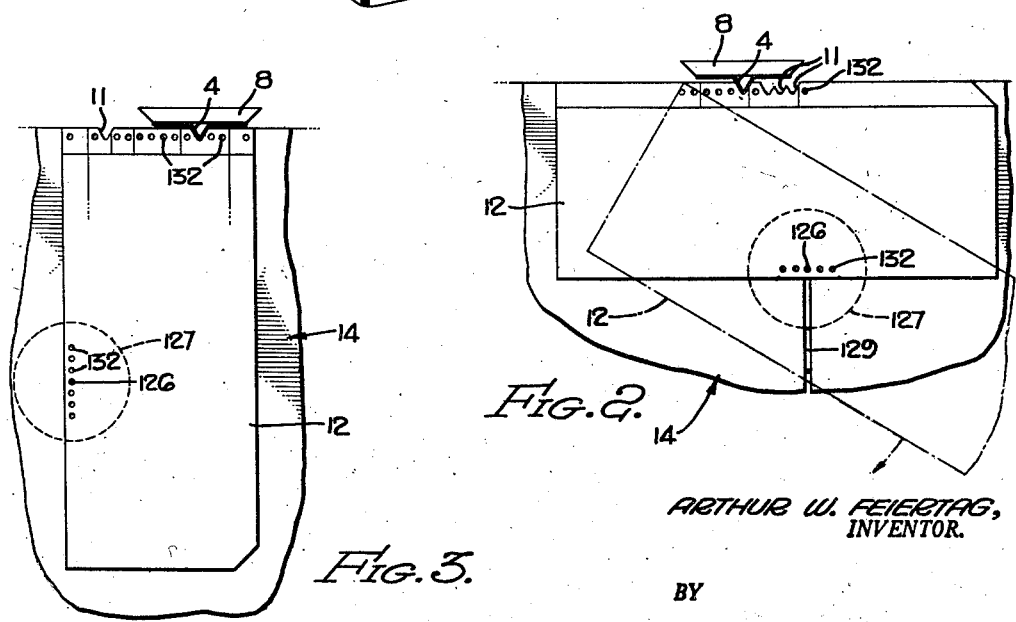
Fig.2.
Fig.3.
ARTHUR W. FEIERTAG,
INVENTOR.
BY
Mellin and Hanscom
ATTORNEYS Dec. 10, 1957  A. W. FEIERTAG  2,815,811
ELECTRIC CARD GROOVER Filed Dec. 21, 1953  9 Sheets-Sheet 2

ARTHUR W. FEIERTAG,
INVENTOR.

BY

Meelin and Hanscom
ATTORNEYS

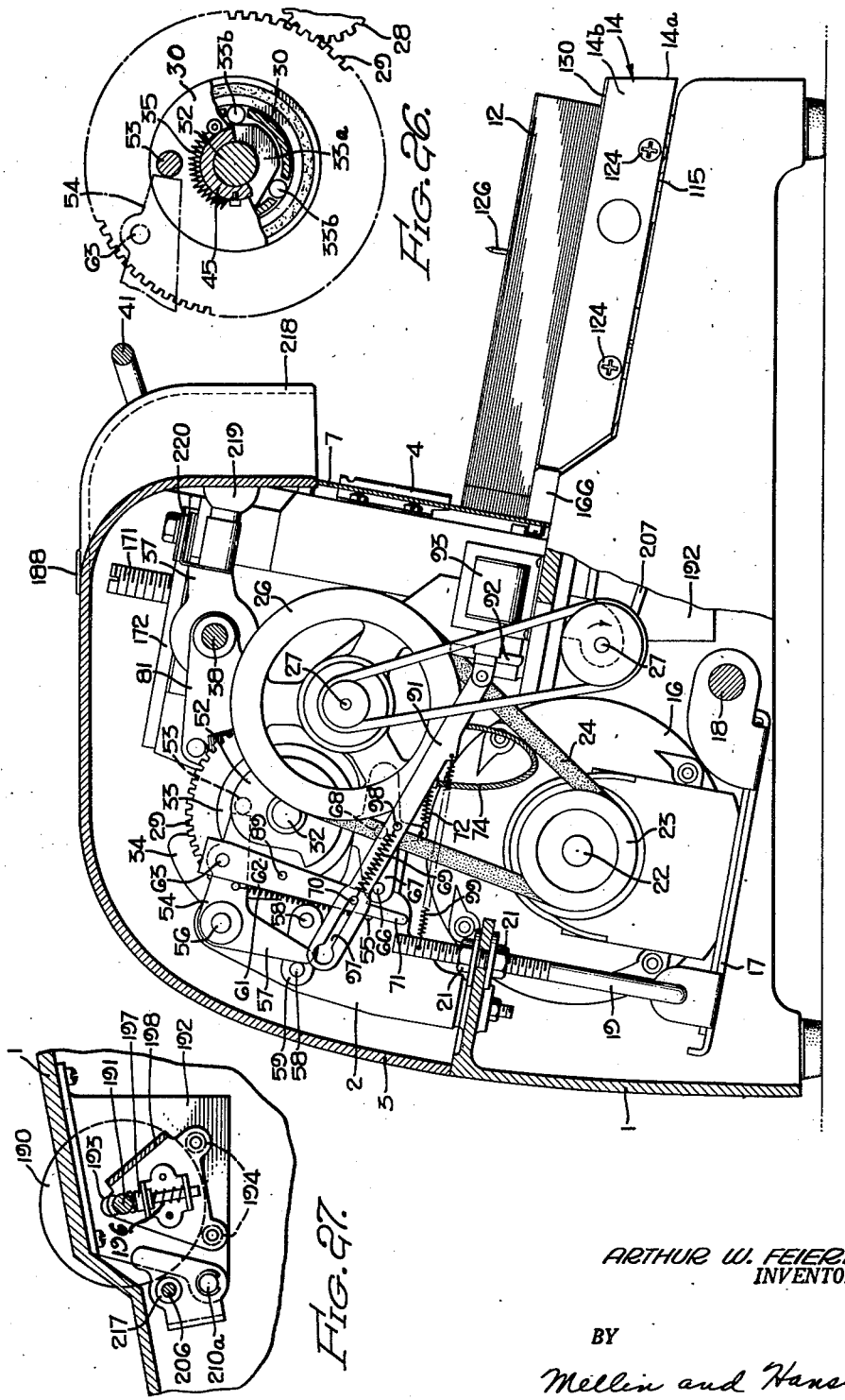

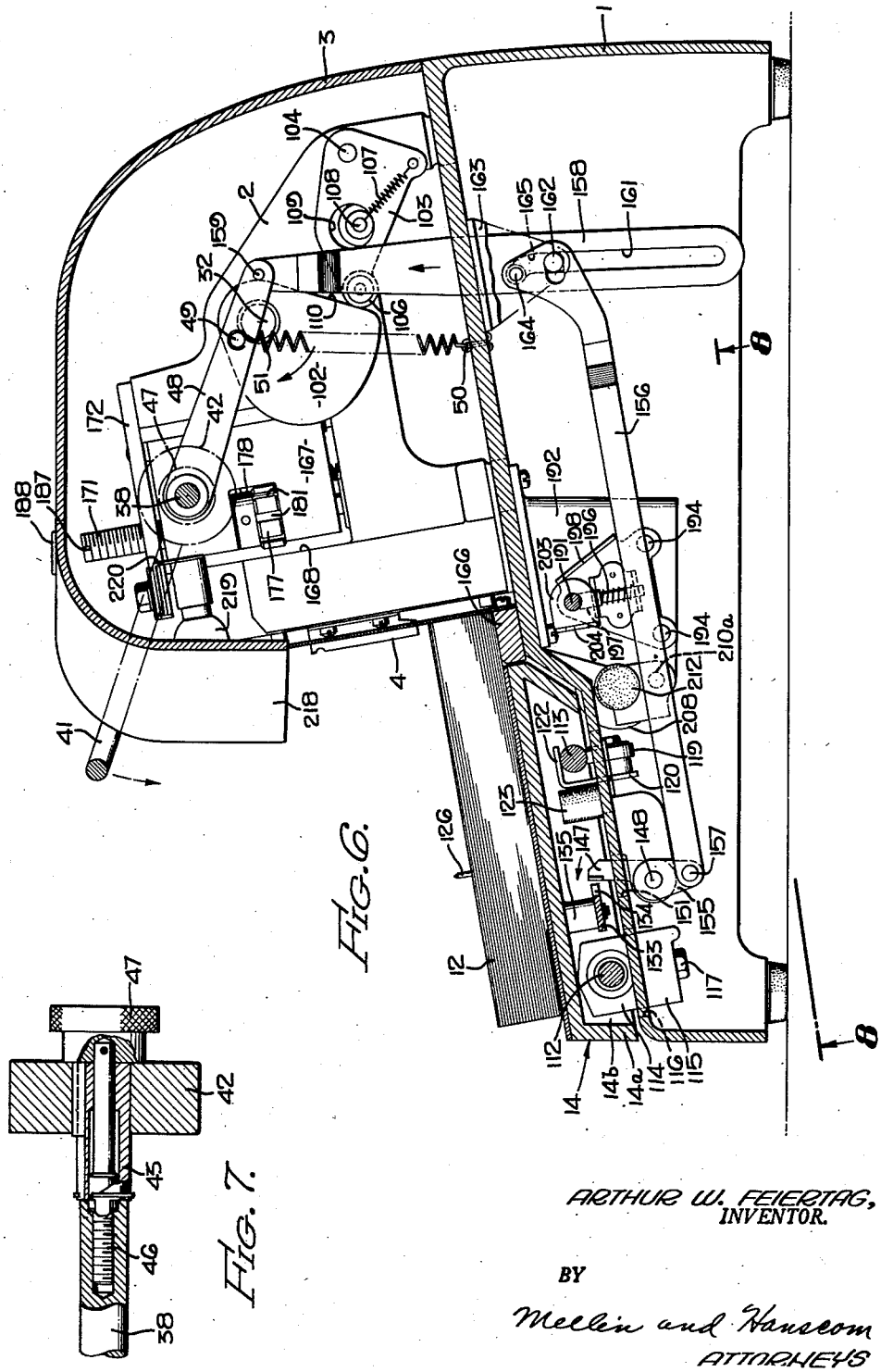

Dec. 10, 1957  A. W. FEIERTAG  2,815,811
ELECTRIC CARD GROOVER
Filed Dec. 21, 1953  9 Sheets-Sheet 5
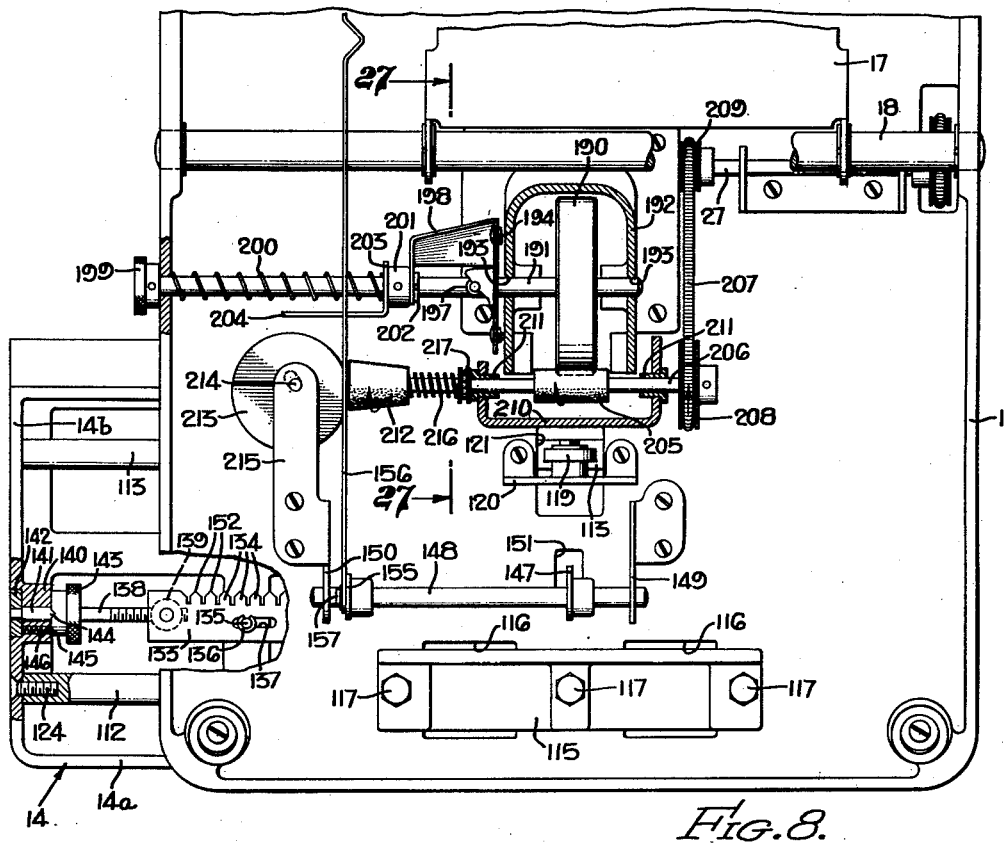
Fig. 8.
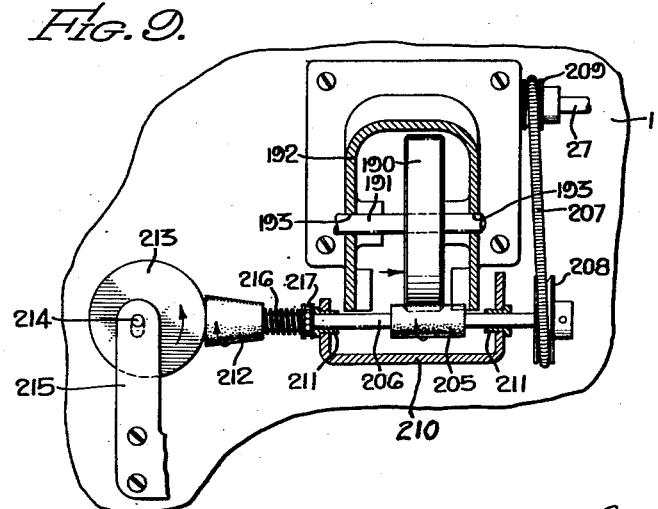
Fig. 9.
Fig. 10.
ARTHUR W. FEIERTAG,
INVENTOR.
BY
Mellin and Hanscom
ATTORNEYS

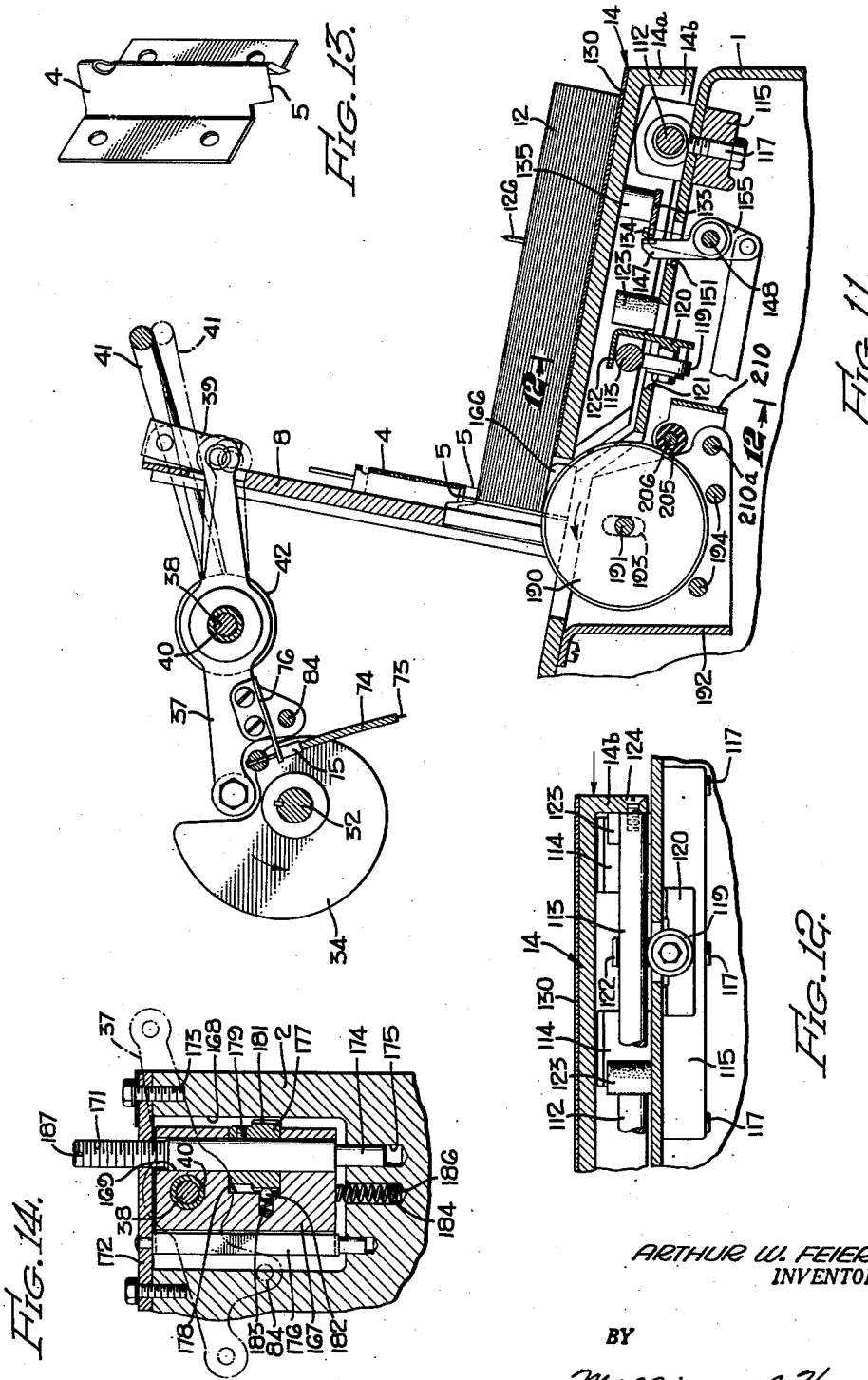

Dec. 10, 1957 A. W. FEIERTAG 2,815,811
ELECTRIC CARD GROOVER
Filed Dec. 21, 1953 9 Sheets-Sheet 7

ARTHUR W. FEIERTAG,
INVENTOR.

BY
Mellin and Hanscom
ATTORNEYS

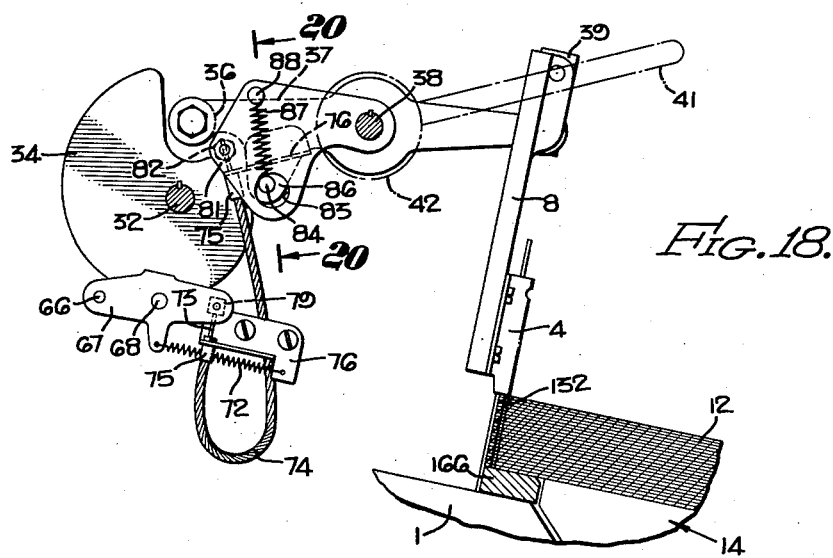
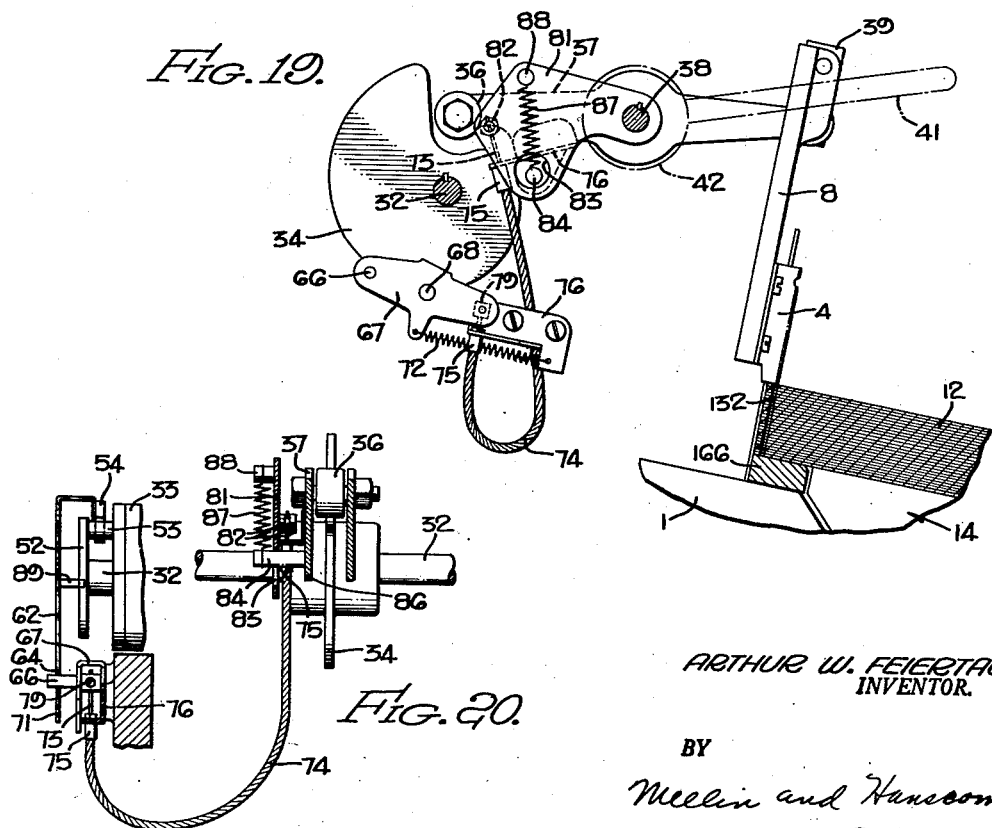
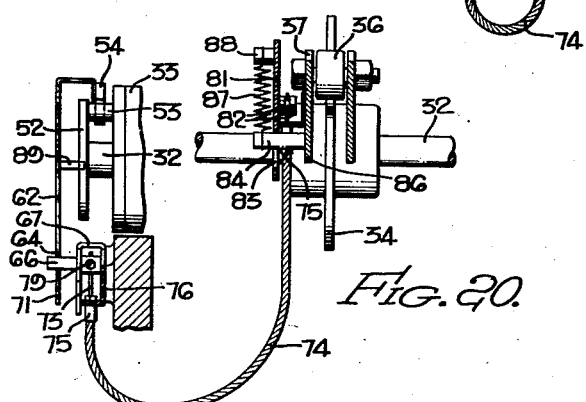

Dec. 10, 1957  A. W. FEIERTAG  2,815,811
ELECTRIC CARD GROOVER
Filed Dec. 21, 1953  9 Sheets-Sheet 9
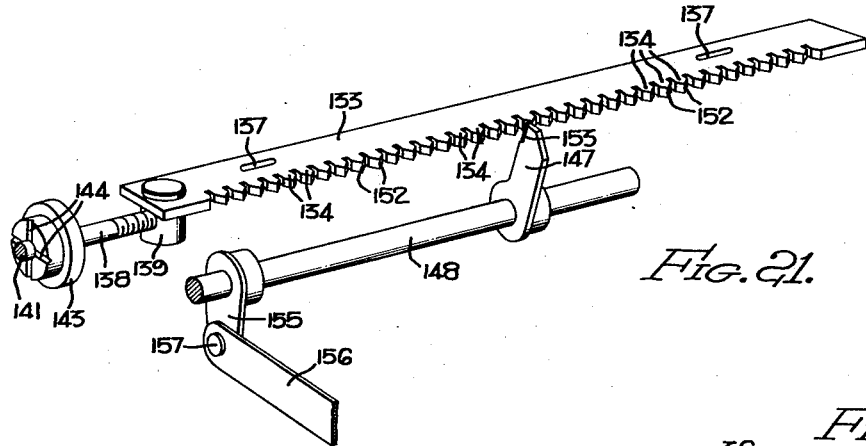
Fig. 21.
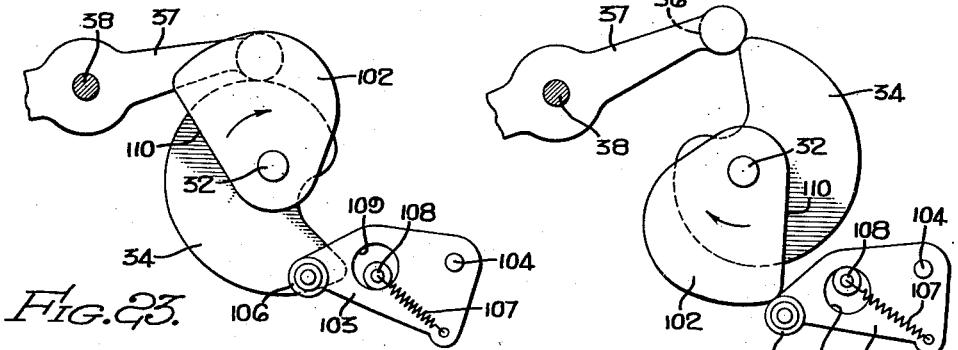
Fig. 23.  Fig. 24.
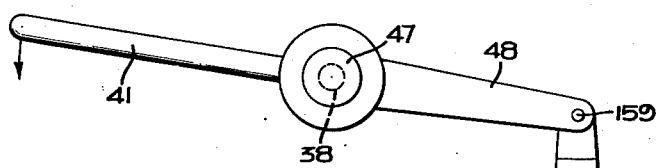
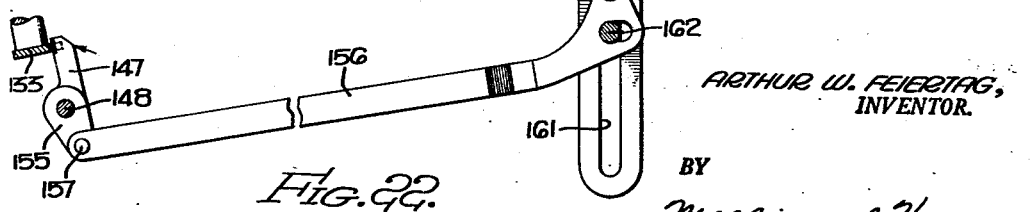
Fig. 25.
Fig. 22.
ARTHUR W. FEIERTAG,
INVENTOR.
BY
Mellin and Hanscom
ATTORNEYS United States Patent Office 2,815,811
Patented Dec. 10, 1957

2,815,811

ELECTRIC CARD GROOVER

Arthur W. Feiertag, Athens, Ohio, assignor, by mesne assignments, to Royal McBee Corporation, a corporation of New York Application December 21, 1953, Serial No. 399,405

7 Claims. (Cl. 164—48)

This invention relates to machines for cutting grooves or notches into the edge portion of cards for identifying the cards with respect to various classifications, and more particularly to a power operated machine for grooving edge portions of a stack of cards at one time.

It is among the objects of the present invention to provide a motor operated mechanism for actuating a cutter to cut coding grooves at accurately positioned points along edge portions of a stack of cards for classifying the cards.

Another object of the invention is to provide a power actuated grooving machine provided with mechanism for controlling the operation, and for guarding against injury to the operator and/or damage to the machine by an incorrect manipulation of moving parts of the machine.

Another object is to provide a power actuated machine of the character described which is manually controlled, and which can operate only through a single cycle for each setting and operation of the manual control.

Another object is to provide a card grooving machine provided with a movable carriage and card aligning means whereby a plurality of cards may be accurately registered, aligned with the cutter, and held against movement during the cutting operation.

Another object is to provide a grooving machine having a movable carriage provided with means for accurately positioning the carriage, and cards carried thereby, with respect to a cutter; and for locking the carriage against movement during operation of the cutter.

A further important object of the invention is to provide a card grooving machine provided with a cutting block, which is moved to present a different area to the cutter at each operation, to distribute and thereby minimize wear; and to provide mounting means permitting the block to be readily removel for refinishing or replacement when required.

Another object is to provide a grooving mechanism provided with a safety lock effective to prevent operation of the cutter until the parts have been properly conditioned for operation by a manual control mechanism.

It is also an object to provide a safety controlled mechanism which prevents manual operation of the cutting element when the power actuating mechanism is disconnected from a source of power.

A still further object is to provide a power actuated cutter of the character described having means for controlling the cutter actuating clutch mechanism at the end of each cycle of operation.

The invention has other objects and features of advantage, some of which with the foregoing will be explained in the following description of that form of the invention illustrated in the drawings. It is to be understood that the invention is not limited to the embodiment shown in the drawings as it may be embodied in other forms and parts may be variously modified within the definition of the claims.

In the drawings:

Fig. 1 is a perspective view of a card grooving machine embodying the invention.

Fig. 2 is a fragmental diagrammatic view illustrating the manner in which a stack of cards may be aligned, grooved and moved to present different edges to the cutter for grooving.

Fig. 3 is a view similar to Fig. 2 showing the cards positioned to present a different edge to the cutter.

Fig. 5 is a vertical sectional view, partly in side elevation, the plane of the section being indicated by the line 5—5 of Fig. 4.

Fig. 6 is a vertical sectional view, the plane of the section being indicated by the line 6—6 of Fig. 4.

Fig. 7 is a fragmental detail, partly in section, illustrating the manner in which the manual control lever is mounted.

Fig. 8 is a partial bottom view of the machine, parts being broken away and parts being shown in section, the figure showing the mechanism as viewed from the line 8—8 of Fig. 6.

Fig. 9 is a fragmental bottom view, partly in section, illustrating the structure and operation of the cutter block actuating mechanism.

Fig. 10 is a fragmental detail showing the mechanism for shifting the cutter block axially.

Fig. 11 is a fragmental sectional view, illustrating the manner in which a stack of cards is held between the cutting blade and the cutting block for grooving, the plane of the section being indicated by the line 11—11 of Fig. 4.

Fig. 12 is a fragmental sectional detail view showing the rear carriage support and retaining means, the plane of the section being indicated by the line 12—12 of Fig. 11.

Fig. 13 is a perspective view of the grooving blade or cutter.

Fig. 14 is an enlarged fragmental sectional detail view illustrating a preferred cutter blade adjusting means, the plane of the section being indicated by line 14—14 of Fig. 4.

Fig. 18 is a view similar to Fig. 15, omitting part of the control mechanism, and illustrating means for moving the blade to contact the card stack at the start of the operation.

Fig. 19 is a view similar to Fig. 18, but showing the hand operating lever depressed sufficiently to operate the clutch throw out lever.

Fig. 20 is a sectional detail showing parts of the control mechanism, the plane of the section being indicated by the line 20—20 of Fig. 18.

Fig. 21 is a perspective view of the carriage positioning comb and locking finger therefor.

Fig. 22 is a fragmental detail view, partly in section, illustrating the connections by which the carriage locking finger is actuated by the manual control lever.

Fig. 23 is a fragmental sectional detail illustrating the clutch limiting mechanism.

Fig. 24 is a view similar to Fig. 23, showing the parts in a different relation.

Fig. 25 is a fragmental sectional detail illustrating the manner in which the card aligning pin is slidably mounted upon the carriage.

Fig. 26 is a fragmental detail view, partly in section, illustrating the driving clutch, the plane of the section being indicated by the line 26—26 of Fig. 4.

Fig. 27 is a fragmental detail view, partly in section, illustrating parts of the cutter block control mechanism, the plane of the section being indicated by the line 27—27 of Fig. 8.

Figure 4:
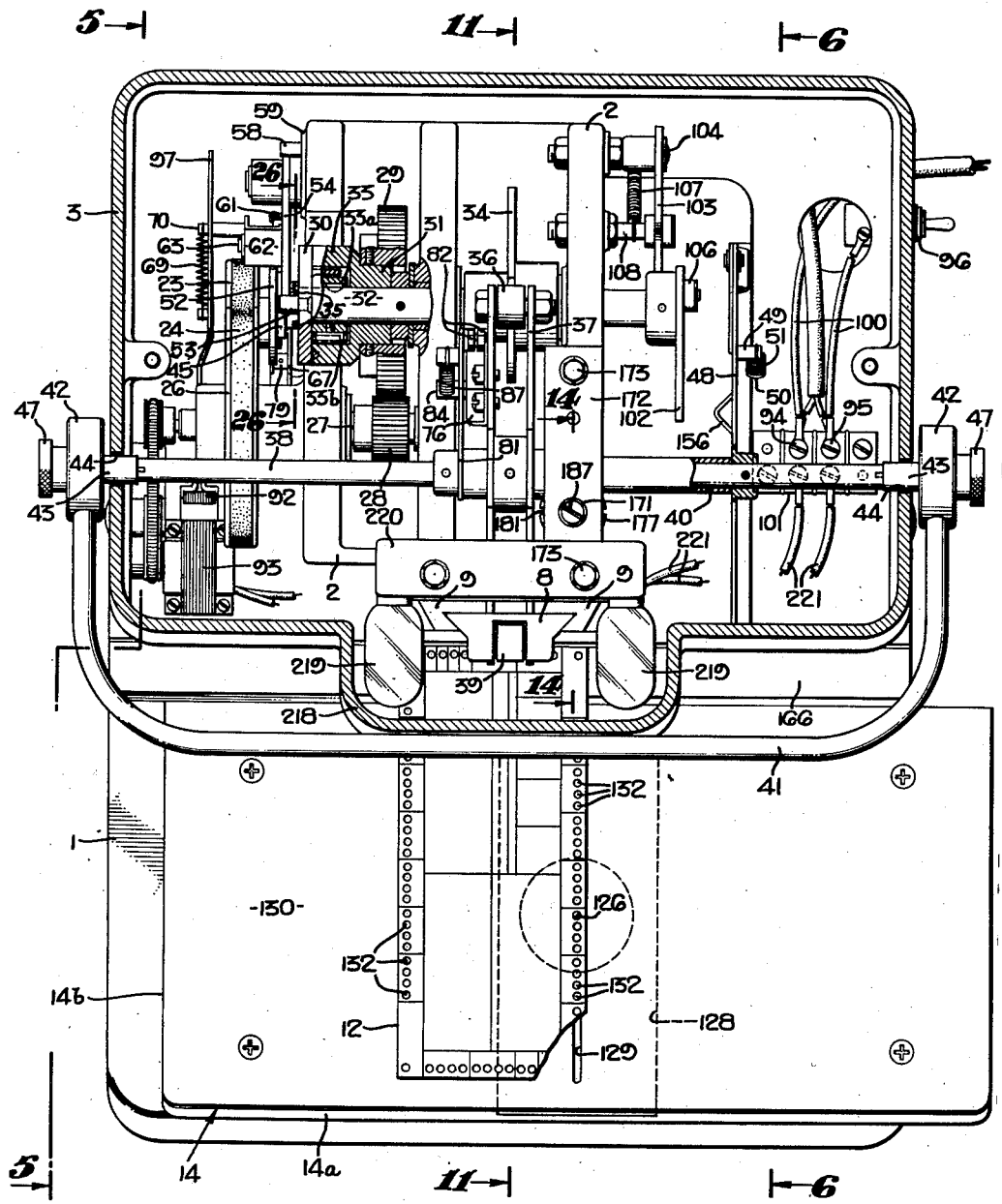
Fig. 4 is a horizontal sectional view looking down upon the mechanism within the housing, the plane of the section being indicated by the line 4—4 of Fig. 1.

In terms of broad inclusion, the grooving device of the present invention comprises a groove cutting blade actuated by a motor driven mechanism for moving the blade through a relatively thick stack of record cards accurately registered and positioned in line with the cutter to cause coding grooves to be cut simultaneously through the stack at accurately positioned points along edge portions of the cards, whereby the cards may be classified. The mechanism includes a clutch operable to transmit power to the blade actuating means only when the mechanism has been conditioned for operation by manual control in a prescribed manner. The invention includes the provision of means for preventing operation of the cutter blade through more than a single complete cycle of operation until the mechanism has been reset and conditioned for further operation. The invention contemplates the provision of means for guarding against inadvertent or incorrectly timed operation of the mechanism, with possible injury to the operator or damage to the machine, and for controlling its action to minimize wear and tear during normal operation.

Another important feature of the invention is the provision of an improved cutter block, removably mounted in association with the cutter, and actuated with both rotative and axial movement, to present a different area to the cutter after each cycle of operation.

In terms of greater detail, the electric grooving machine of my invention comprises a base frame housing 1 on which is secured an upstanding mounting bracket 2 for supporting mechanism normally enclosed by a cover 3 removably secured to the base housing 1. A cutter 4, is mounted for reciprocating movement upon the mounting bracket 2. The cutter extends outwardly from the housing cover 3 through an opening 6 formed in a shield plate 7 mounted across the front of the cover housing 3. The cutter 4 is replaceably secured to a slide block 8, slidably movable along guide ways 9 secured to mounting bracket 2. The cutter 4 is provided with a V-shaped cutting edge 5 of a character suitable for cutting grooves 11 in the edges of a stack of record cards 12 supported upon a carriage 14 movable to present the cards to the cutter for grooving at predetermined points.

An electric motor 16 is mounted upon a platform 17 pivotally mounted within the base housing 1 upon a pivot shaft 18. The position of the platform 17, and the motor 16 carried thereby, is adjusted by means of a supporting arm 19, extending through an opening in the top of the base housing 1. The arm 19 is threaded to receive adjusting nuts 21 positioned above and below the top of the housing for securing the arm and the bracket in an adjusted position. The motor 16 is provided with a shaft 22 upon which is secured a main drive pulley 23. A belt 24 is mounted over the pulley 23 and a pulley 26 secured to a main drive shaft 27 journaled upon the mounting bracket 2.

A drive pinion 28 is secured to the main drive shaft 27 in meshing engagement with a drive gear 29 secured upon a hub 31 rotatably mounted upon the shaft 32. The hub 31 is an integral part of the clutch drum 33 of an over-running clutch arranged to actuate a cam shaft 32. The clutch is provided with a plurality of rolls 33b mounted between the drum 33 and a clutch cam 33a keyed to the shaft 32. A roll cage 30 retains the rolls 33b in operative relation to the drum and clutch cam. Springs 35 are connected to the cage 30 and to a collar 45 keyed to the cam shaft 32 for normally urging the cage in a direction such as to cause the rolls to effect driving engagement of the drum 33 with the cam 33a. The drum 33 is freely rotatable with the hub 31 and gear 29 while the roll cage 30 is held against rotation, and delivers driving force to the cam shaft 32 when the cage 30 is released, as hereinafter more fully explained.

The cam shaft 32 is provided with a cutter actuating cam 34 secured to the shaft, and arranged to engage a roller 36 mounted upon the inner end of a cutter actuating arm 37 pivotally supported upon a sleeve 40 mounted securely in a block 167 between arms 81 and 48 on control shaft 38 which extends between the sides of the cover housing 3. The outer end of the cutter actuating arm 37 is pivoted to a link 39 which in turn is pivoted to the cutter block 8. The control shaft 38 is journaled upon the mounting bracket 2, and is manually operable by means of a hand lever 41 of bail shape, releasably secured to the ends of the control shaft 38 by means of hubs 42 having slidable sleeves 43 extending inwardly through openings 44 in the side walls of the cover housing 3. The hubs 42 are releasably secured in interlocking engagement with the ends of the control shaft 38 by screws 46 threaded into the end of the shaft and provided with knobs 47 by which they may be operated to removably attach the hubs to the control shaft 38, as illustrated in detail in Fig. 7 of the drawings.

An arm 48 secured to the control shaft 38 is provided with a pin 49 to which one end of a tension spring 51 is secured. The other end of the spring 51 is anchored to the base housing 1, as at 50. The spring 51 operates to urge the shaft 38 in a direction such as to move the cutter actuating arm 37 to its normal starting position, with the cutter 4 elevated and the roller 36 positioned for driving engagement by the cam 34. In this starting position the hand lever 41 occupies a raised position, as shown in Figs. 1, 5 and 6 of the drawings. Downward pressure applied to the hand lever 41 will cause rotation of the shaft 38, and a corresponding movement of the mechanism associated therewith, for moving the cutter 4 against the stack of cards as illustrated in broken lines in Fig. 11 of the drawings.

For cutting through a thick stack of cards, the speed and power of an electric motor is required. Because a power operated cutter can inflict serious injury to an operator, and because the cards must be accurately positioned and held for the cutting operation, it is necessary that the mechanism for operating the cutter be closely controlled.

Figure 15:
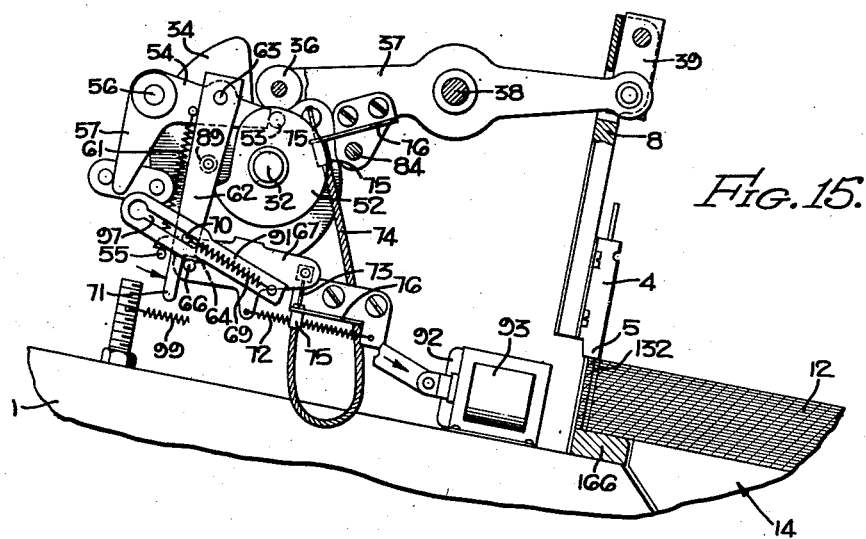
Fig. 15 is a fragmental sectional view, partly in elevation, illustrating the cutter actuating mechanism at one stage of its operation.

For controlling the operation of the cutter driving mechanism, a control cam 52 is secured to a collar 45 which is keyed to the cam shaft 32 in spaced relation to the clutch drum 33. A detent pin 53, secured to the roll cage 30 of the clutch drum 33, extends toward the cam 52. The detent pin 53 is positioned to engage a pivoted detent arm 54 pivoted upon the mounting bracket 2 by means of a pivot pin 56. An extension 57 carried by the detent arm 54 is movable between stop pins 58 securely driven into a boss 59 upon the mounting bracket 2, and operating to limit the throw of the detent extension arm 57. A tension spring 61 attached to the detent arm 54 and to an anchor pin 55 upon the mounting bracket 2 normally urges the detent arm to its locking position, as indicated in Fig. 15 of the drawings. An actuating link 62 is pivoted to the detent arm 54 by means of a pivot pin 63. The lower end of the link 62 is provided with a shoulder 64 arranged to engage an actuating pin 66 secured upon an actuating rocker arm 67 pivoted to the mounting bracket 2 by means of a pivot pin 68. The shoulder 64 is in substantial alignment with the pivot pin 63, and when seated in engagement with the pin 66 is operable to transmit an upward movement of the pin 66 to the detent arm 54 for lifting said arm out of engagement with the detent pin 53.

Figure 17:
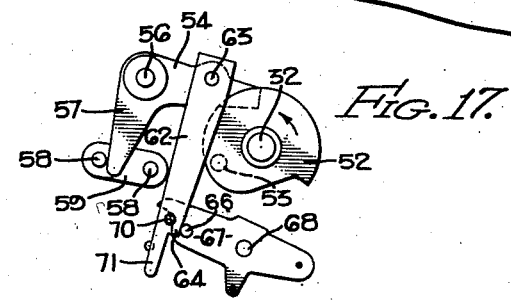
Fig. 17 is a detail view, illustrating somewhat diagrammatically, the cutter control cam and associated parts in the positions occupied during a single cycle of operation of the cutter.

The arm 62 is normally swung to seat against the pin 66 by means of a tension spring 69 having one end attached to an anchoring pin 70 secured to the arm 62 near the shoulder 64. Movement of the arm 62 toward the pin 66 is limited by its engagement with said pin. When the shoulder 64 is seated upon the pin 66, movement of the arm 62 is limited by a reduced extension 71; and, when the shoulder 64 is displaced out of engagement with the pin 66, movement of the arm toward the pin is limited by engagement of the edge of the arm above the shoulder 64 with said pin, as shown in Fig. 17 of the drawings. The rocker arm 67 is normally urged toward its normal starting position by means of a tension spring 72, which exerts a light force tending to move the pin 66 downwardly to a point where it may be engaged by the shoulder 64.

Figure 16:
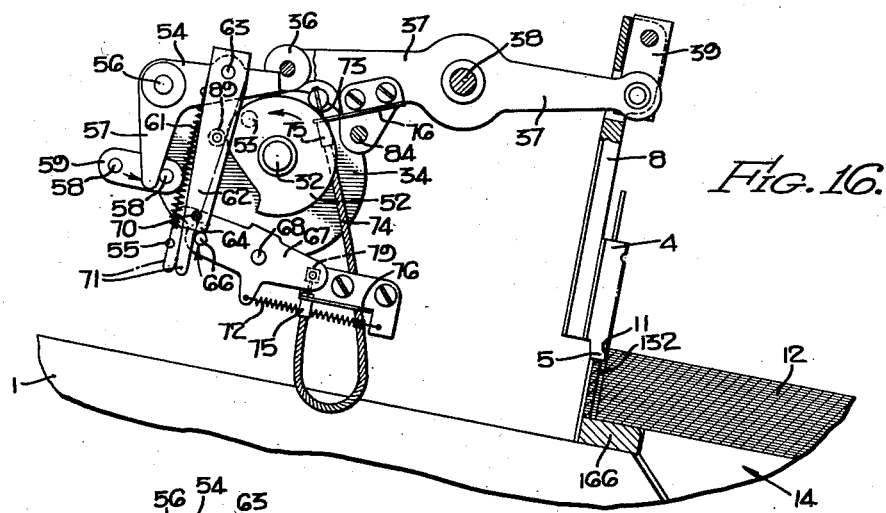
Fig. 16 is a fragmental sectional view, partly in elevation, similar to Fig. 15, and showing the cutter actuating mechanism in another position.

The rocker arm 67 is actuated by means of a flexible wire 73 operating through a guide cable 74 secured at its ends to fixed anchor guide members 75 secured to bracket plates 76 secured to the main mounting bracket 2 adjacent the rocker arm 67 and the cutter actuating arm 37 as illustrated in Figs. 15, 16 and 20. The wire is secured at one end to the rocker arm 67 by means of a suitable clamping means 79. At its other end, the wire is clamped to an arm 81 secured to the control shaft 38 in spaced substantially parallel relation to the cutter actuating arm 37, the wire being secured between suitable clamping nuts 82 or other suitable securing means. The arm 81 has an opening 83 formed therein through which a pin 84 extends. The pin 84 is secured to a downwardly extending projection 86 carried by the cutter actuating arm 37. A tension spring 87 is connected to the outer end of the pin 84, and to a pin 88 secured to the arm 81. The opening 83 is a diameter substantially greater than the diameter of the pin 84 so as to permit a limited range of movement of the arm 81 relative to the pin and to the cutter actuating arm, as best illustrated in Figs. 18 and 19 of the drawings.

Downward movement of the hand lever or bail 41 imparts a turning movement to the control shaft 38 and the arm 81 such as to cause the wire 73 to be drawn from the position shown in Fig. 18 of the drawing to the position indicated in Fig. 19 of the drawing. This causes the rocker arm 67 to swing from the position shown in Figs. 15 and 18 to the position shown in Figs. 16 and 19 of the drawings. This in turn causes the pin 66 to impart an upward movement to the actuating link 62 sufficient to raise the detent 54 out of the path of the detent pin 53. This frees the clutch cage 30 which then activates the clutch to impart rotation to the cam shaft 32. Rotation of the cam shaft 32 causes the cam 34 to be moved in a counter-clockwise direction as viewed in Fig. 11 of the drawings, and serves to impart cutter actuating movement to the cutter arm 37. The cam 34 is so shaped that the arm 37 is swung through its full range of downward movement at a substantially uniform rate, and is snapped back to its starting position very rapidly as the high point of the cam passes the cam engaging roller 36 of the arm 37.

The cam 52, which is secured to the collar 45 upon the cam shaft 32 and is rotated thereby, is arranged to engage a cam pin 89 secured to the detent actuating link 62. As the high point of the cam 52 passes the pin 89, the link 62 is moved about the pivot pin 63 from the position shown in full lines in Figs. 15 and 16 to the position indicated in broken lines in Fig. 16. This causes the shoulder 64 to be moved out of engagement with the pin 66. The tension of the spring 61 causes the link 62 to pass the pin 66 and the detent 54 to move back into the path of the detent pin 53 as indicated in Fig. 17 of the drawings. This causes the detent 54 to halt the rotation of the clutch cage 30, and thereby limits the rotation of the cam shaft 32 to one full rotation or 360° of movement. The rocker arm 67 is held in its displaced position, and the side of the link 62 above the shoulder 64 rests against the pin 66, until the rocker arm is restored to its starting position by a return movement of the hand lever 41 to its starting position. Thus, in the event the hand lever 41 is held in its depressed position, rotation of the cam shaft 32 and associated cams will not continue through a second cycle, but will be held against operation by engagement of the pin 53 with the detent 54 until the rocker arm 67 is reset by movement of the hand lever 41 to lower the pin 66 until it is again engaged by the shoulder 64.

To guard against inadvertent operation of the machine manually, or an inadvertent or unauthorized tampering, while the machine is not connected for operation to a source of power, such as might result in an unexpected operation of the cutting element with possible injury to the operator or damage to the machine or to cards not properly positioned for cutting, a safety arm 91 is provided. The safety arm 91 is pivoted at one end to the armature 92 of a solenoid 93 electrically connected into the circuit through which the motor 16 is connected to its source of power, as for example, by leads 100 connected to buss bar 101 having terminals 94 and 95 through which current is supplied to the motor. One of the connections to the source of power is provided with a switch 96 by which the circuit to both the motor and the solenoid may be closed and broken as desired. When the circuit through the motor is closed, the solenoid is energized and the armature is moved from its normal position, shown in full lines in Fig. 5 of the drawings, to a retracted position as shown in Fig. 15 of the drawings. The other end of the safety arm 91 is provided with a longitudinally extending slot 97 slidably engaging the pin 70 to which the tension spring 69 is anchored. The other end of the tension spring 69 is secured to the safety arm 91 by a pin 98 so that the pin 70 will normally be moved toward the end of the slot 97 nearest the solenoid 93, regardless of which position the armature 92 is in. When the armature 92 is in its normal outwardly extending position as shown in Fig. 5, the safety arm 91 holds the actuating link 62 in a displaced position such that the shoulder 64 is held clear of the actuating pin 66. As a consequence, displacement of the rocker arm 67 by manual operation of the handle 41 does not release the detent 54, and hence, no relative shifting of the parts is possible while the machine is disconencted from the source of power. The armature 92 is normally moved toward its outwardly extending position by a tension spring 99 connected to the safety arm 91, as best illustrated in Fig. 5 of the drawings.

As the cutter arm roller 36 drops off the high point of the cam 34, and the stop pin 53 strikes against the detent 54 to interrupt the operation of the cutting mechanism, the abrupt action tends to cause a reverse rotation of the cam shaft and a chattering of the rolls and cam flats within the clutch. To prevent such action and to cause the clutch rolls to be centered with respect to the cam flats, a control cam 102 is secured upon the cam shaft 32. A control arm 103, pivoted upon the main mounting bracket 2 by a pivot pin 104, is provided with a cam engaging roller 106. A spring 107, secured to the arm 103 and to a stud 108 secured to the mounting bracket 2, urges the cam roller 106 toward the cam 102 and serves as a means for limiting the rotation of the cam shaft at the end of its cycle of operation. As illustrated, the stud 108 extends through an opening 109 in the arm 103 to limit the range of movement of said arm. As the cam roller 36 drops off the high point of its cam 34, the cam roller 106 engages a receding portion 110 of the cam 102 to limit the movement of the cam shaft 32, as best illustrated in Figs. 6, 23 and 24 of the drawings. The roller 106 and stud 108 are rubber covered to minimize noise.

The carriage 14, by which the cards 12 are supported for movement into position for grooving by the cutting element 4, comprises a body of generally rectangular shape substantially conforming in size and shape to the lower forward portion of the base frame housing 1. The carriage body is provided with a smooth upper surface substantially parallel to the top of main housing 1, and is provided with downwardly extending flanges 14a and 14b along the front and sides respectively substantially aligned with the front and side of the front part of the base housing when the carriage is in its central position. Front and back carriage supporting rods 112 and 113 are mounted to extend across the under side of the carriage body between the end flanges 14b, and in spaced parallel relation to the front flange 14a. The front mounting shaft 112 is slidably mounted for movement in an axial direction through lugs 114 formed upon the ends of a mounting member 115 secured to the base housing 1 adjacent the front edge thereof. As illustrated, the lugs 114 extend upwardly through openings 116 in the housing 1, the body of the mounting member 115 being secured within the housing by machine screws 117 or other suitable securing means.

The rod 113 engages a roller 119 journaled upon a bracket 120 secured to the under side of the base housing 1. The roller 119 is positioned below the rod 113, and rotates upon an axis disposed at right angles to the axis of the rod 113. The roller extends to a level slightly above the upper surface of the base housing 1, through an opening 121 formed in said housing. A finger 122 formed on the bracket 120 extends upwardly through the opening 121 and overhangs the rod 113 to hold the carriage in its operative position and prevent pivotal movement about the shaft or rod 112. A pair of rubber bumpers 123 are mounted upon the top of the housing 1 adjacent the carriage rod 113 and at opposite side of the roller 119 and the finger 122. The bumpers 123 provide stops against which the side walls 14b of the carriage may be moved, and which limit the transverse movement of the carriage relative to the base housing 1 and the cutter 4. The rods 112 and 113 are secured to the carriage body by means of screws 124 threaded axially into the rods through openings in the side walls of the carriage. The carriage may be removed from the base frame by taking out the screws 124 by which the rod 112 is held in place, thereby permitting the carriage to be moved to carry the rod 113 from under the finger 122.

In order to hold a plurality of cards in accurate registration for grooving, an aligning pin 126 is adjustably mounted to extend upwardly normal to the plane of the carriage. The pin is secured to a mounting disc 127 movable along a channel 128 formed in top of the carriage body 14. The pin 126 extends outwardly through a slot 129 in a cover plate 130 applied over the upper surface of the carriage body 14 and providing a smooth working surface thereon. The slot 129 is centered with respect to the channel 128 and permits movement of the aligning pin across the carriage at right angles to the direction of movement of the carriage relative to the base frame 1 and cutter 4. The aligning pin 126 is arranged to extend through any of a plurality of coding apertures 132 formed along edge portions of the cards 12, as best illustrated in Fig. 1 of the drawings. The pin holds the cards in registering relation and prevents relative displacement by the cutter during the grooving operation. When the pin 126 extends through an aperture on one side of the stack of cards, as indicated in Fig. 1, the stack can be turned to present either of three sides to the cutting element. For example, the cards may be held as indicated in Fig. 1 for grooving the cards at one end. Without disturbing the registration, and the engagement of the stack by the pin, the stack may be moved bodily about the aligning pin 126 as a pivot, as indicated by broken lines in Fig. 2 of the drawings, to present a longitudinal side to the cutter as indicated in full lines in Fig. 2, or to present the opposite end to the cutter as indicated in full lines in Fig. 3. The stack must be removed and the cards replaced with the pin extending through an aperture upon another side of the card before the edge originally applied over pin 126 can be moved to notching position.

A stack of cards placed upon the aligning pin 126 is moved to place the edge of the stack where a groove is to be cut against the facing plate 7 of the cover housing. The carriage 14 is then shifted bodily to the right or left as required to position the stack so that the cutter 4 can be operated to groove the edges of the cards to a selected coding aperture. Since the apertures are placed as close together as possible, it is necessary that the cards be accurately positioned with a desired aperture aligned with the cutter 4 to insure proper coding. To insure such alignment, an aligning plate or comb 133 is secured across the under side of the carriage 14 between the carriage rods 112 and 113 in parallel relation to said rods. The comb 133 is provided with a plurality of teeth 134 spaced to conform to the spacing of the coding apertures 132 of the cards 12 to be coded. The comb is supported by lugs 135 extending downwardly from the under side of the carriage body by retaining members 136 applied through longitudinally extending slots 137 whereby the comb may be adjusted relative to the supporting lugs. Adjustment is effected by means of an adjusting screw 138 threaded into a boss 139 secured to one end of the comb. The screw 138 is provided with a bearing portion 141 seating within a boss 140 formed on the inner side of the carriage end wall 14b, and is held in assembled relation therewith by a retaining washer 142. A knurled knob 143 is secured to the screw for imparting rotation thereto, and detent grooves 144 are formed in the end of the knob to be engaged by a detent ball 145 mounted in the boss 140 are pressed into engagement with the grooves 144 by a spring 146. Rotation of the knurled knob 143 as it bears against the boss 140 imparts a longitudinal movement to the comb 133, whereby the spaces between the teeth of the comb may be brought into register with the apertures 132 along the edge of the cards 12.

The carriage 14 is arranged to be locked at a selected position during operation of the cutting mechanism. This is accomplished by means of a locking finger 147 secured to a shaft 148 pivotally mounted on the under side of the base housing 1 by means of brackets 149 and 150. The finger 147 extends upwardly through an opening 151 in the top of the housing 1 for movement into and out of engagement with the teeth of the comb 133. The ends of the teeth 134 along the edge of the aligning comb are pointed as at 152, and the edge of the finger 147 engaging the teeth is beveled as at 153 so that when the finger is moved toward a locking position, engagement of a beveled face of the finger with the pointed end of an adjacent tooth will serve to move the carriage into exact alignment with the selected coding aperture corresponding to the space into which the locking finger is moved.

The finger 147 is moved to and from locking position by means of a crank arm 155 secured to the shaft 148 and pivotally engaged by an actuating link 156 by means of a pivot pin 157. The actuating link 156 extends rearwardly into engagement with an arm 158 pivotally connected at its upper end to the arm 48 by means of a pivot pin 159. The arm 158 is provided with a longitudinally extending slot 161 engaging a guide pin 162 carried by a bracket 163 upon the under side of the main base housing 1. The slot 161 is provided with a curved cam portion 165 movable to engage a pin 164 secured to the connecting link 156 and slidably engaging the slot 161, as best illustrated in Figs. 6 and 22 of the drawings. The arm 48, being carried by the shaft 38, which in turn is actuated by the hand lever 41, normally forces the arm 158 downwardly to the unlocking position indicated in Fig. 6 of the drawings. When the hand lever 41 is depressed to set mechanism into operation, the initial movement of the lever 41 causes the arm 158 to be raised to the locking position shown in Fig. 22 of the drawings. This movement of the arm 158 causes the pin 164 to be displaced by the cam surface 165 sufficiently to cause the crank arm 155 to swing the locking finger 147 into engagement with the aligning comb. This movement occurs during the interval of movement required to actuate the rocker arm 67 for releasing the detent 54. As a consequence, the locking finger 147 is moved to accurately align the carriage with a selected coding aperture, and lock the carriage against further movement, before the cutter is moved along its cutting stroke.

The edge of the stack of cards 12 in which the coding groove is to be cut, is solidly supported upon a bar 166 which extends across the width of the base housing 1 with its upper surface in the plane defined by the cover plate 130. The front shield plate 7 is secured to the bar at right angles to the plane of the upper surface of the bar and cover plate 130, so that the stack may be held firmly in cutting position. The initial downward movement of the hand lever 41, which serves to actuate the finger 147 into locking engagement with the comb 133, and to actuate the rocker arm 67 and detent 54 to clutch releasing position, also causes the cutter 4 to be moved downwardly from its normal elevated position shown in full lines in Figs. 5, 6 and 11 of the drawings into engagement with the top of the stack of cards as indicated in dotted lines in Fig. 11 and in full lines in Figs. 15, 18 and 19 of the drawings.

This movement of the cutter is caused by the action of the control arm 81 and spring 87 which, by their engagement with the pin 84 extending through the opening 83, causes the cutting arm 37 to move with the control arm 81 until the cutter seats upon the stack of cards. After the cutter blade contacts the top of the stack of cards, further movement of the control arm 81 is permitted by the opening 83 without imposing cutting pressure upon the cutter 4. The further movement of the lever 41 actuates the rocker arm 67 and lifts the detent 54 out of the path of the detent pin 53, and thereby frees the clutch drum 33 to rotate the cam shaft 32 through a single revolution as above described. Rotation of the cam 34, by the shaft 32 from the starting position indicated in Figs. 11, 18 and 19 of the drawings causes the cam to engage the roller 36 and thereby move the arm 37 to force the cutter 4 downwardly through the cards as indicated in Fig. 16 of the drawings. The throw of the cam 34 is sufficient to force the cutter entirely through the stack of cards, which in the embodiment illustrated may include as many as about 150 separate cards to be grooved at the same time. As the roller 36 passes off from the high point of the cam, the cutter is returned instantly to its starting position indicated in Figs. 5 and 6, and the operation is halted until the mechanism is reconditioned by a return of the hand lever to its starting position as above explained.

In order to insure penetration of the cutter 4 through the lowermost card of the stack, without damage to the cutter or to the surface against which it is pressed, provision is made for adjusting the down movement of the cutter. In the embodiment illustrated, this is accomplished by adjustably mounting the control shaft 38, on which the cutter actuating arm 37 pivots, as best illustrated in Fig. 14 of the drawings. In this arrangement, the shaft 38 is journaled in the sleeve 40, which is pressed into an adjustably mounted block 167 slidable within a recess 168 formed in one of the ribs of the mounting bracket 2. The block 167 is provided with a bore 169 within which is mounted an adjusting screw 171. The upper end of the adjusting screw 171 is threaded through a plate 172 secured to the bracket 2 by screws 173 or other suitable securing means. A reduced extension 174 is formed on the lower or inner end of the adjusting screw 171 to seat within a journal recess 175 drilled into the bottom of the recess 168. The block 167 is movable within the recess 168 along a guide 176 cooperating with the screw 171 to hold the journal block 167 in proper alignment.

The adjusting screw 171 extends through a detent hub 177 seating within a recess 178 in the side of the journal block 167 and secured to the adjusting screw by a set screw 179. The detent hub 177 is provided with a plurality of grooves 181 circumferentially spaced around its periphery and engaged by a detent 182 pressed into engagement therewith by a light spring 183. A compression spring 184 seated within a recess 186 in the bottom of the recess 168 normally resists downward movement of the journal block 167 and minimizes lost motion in the adjustment of the block. The top of the adjusting screw 171 is provided with a slot 187 so that the screw may be actuated by a screw driver introduced through an opening 188 in the top of the housing cover 3 for effecting a final close adjustment of the cutter without removing the cover 3 and without disturbing or exposing other portions of the mechanism.

In order to insure a clean cut through the lowermost card of the stack of cards 12, the machine is provided with a cutter block 190 made of wood or other suitable material onto which the cutting edge may be pressed without damage to the cutting edge. While it would be possible on a stationary block of hard wood or similar material positioned in line with the cutting element 4, such a block would be short lived as repeated engagement by the cutting knife 4 onto the same area of the block would soon scar the block in such a way as to prevent a clean cut through the lowermost card 12.

To minimize the scoring action of the cutter 4, and to provide a cutter block which will stand up under hard usage, the present machine is provided with a rotatable cutter block of cylindrical form rotated and shifted axially with respect to the cutter between successive operations of the cutter.

As illustrated, the cutter block 190 is a cylindrical body of wood, plastic, or other suitable material, mounted for free rotation upon a shaft 191 extending across a mounting bracket 192 secured on the under side of the main base housing 1. The shaft 191 is yieldably supported within elongated bearing openings 193 formed in opposite sides of the bracket 192. The bearing openings permit a limited vertical movement of the shaft 191 and cutter block 190 upon the bracket 192 whereby the cutter block 190 may be moved to engage and disengage a pair of stop rods 194 extending transversely across the bracket 192 below the cutting block 190. The shaft 191 is normally held in its raised position in engagement with the tops of the elongated bearing openings 193 by a spring 196 exerting an upward pressure against a block 197 mounted upon a bracket 198 positioned upon one side of the bracket 192.

The rods 194 are slidably movable relative to the bracket 192, and are secured at one end to the bracket 198 for axial movement thereby. The shaft 191 extends through the bracket 198 and the adjacent side wall of the base housing 1; and is provided with a knob 199 upon the outer end thereof by which the shaft may be moved axially to disengage the cutter block 190. A compression spring 200 is mounted over the shaft 191, between the housing 1 and a collar 201 secured to the shaft, to normally urge the shaft toward its operative position. The end portion of the bracket 198 adjacent the bracket 192 has an elongated opening matching with the bearing openings 193 of the bracket 192 to permit relative vertical movement of the shaft; and the other end of the bracket 198 is similarly slotted and is engaged between the collar 201 and a retainer 202 for moving the bracket with the shaft.

Axial movement of the shaft 191 to disengage the cutter block 190 causes the rods 194 to be moved from under the block, thereby permitting the block to be removed for refinishing or replacement as required. A stop 203, having a finger 204 extending longitudinally from the hub toward the housing wall 1, limits movement of the shaft 191 to permit removal of a cutting block 190 without moving the shaft 191 entirely out of engagement with the bracket 192.

The block 190 is rotated upon the shaft 191 by means of a roller 205 secured to a shaft 206 extending transversely across the mounting bracket 192 in a position such as to maintain a light driving contact with the periphery of the cylindrical cutting block 190. The shaft 206 is driven by means of a belt 207, preferably of coil spring construction, operating over a pulley 208 secured to the shaft 206, and a pulley 209 secured to the motor driven shaft 27.

The shaft 206 is axially movable through journals 211 in the arms of a bail 210 pivotally mounted upon the bracket 192 by means of a pivot shaft 210a. A drive hub 212 of rubber or other suitable material is secured upon the end of the shaft 206 opposite the drive pulley 208. The drive hub 212 abuts against a cam 213 mounted upon an eccentrically positioned mounting pin 214 carried by a mounting bracket 215. The cam 213 is provided with a knurled or toothed edge engaging the end of the drive hub 212 at a point offset from the axis of the hub 212 and the shaft 206, as best illustrated in Fig. 10 of the drawings. The hub 212 is held in driving engagement with the cam 213 by means of a compression spring 216 mounted between the hub 212 and a thrust bearing 217 carried by the shaft 206. The cam 213 is freely rotatable upon the bracket 215. As the cam is driven by contact with the end of the hub 212, its eccentricity causes the hub, and the shaft 206 upon which it is mounted, to be shifted axially with a reciprocating movement through a range equal to the throw of the cam 213. The length and flexibility of the belt or cable 207 permits the shaft 206 to be shifted without disturbing the driving connection to the shaft through the belt, as best indicated in Fig. 9 of the drawings.

As the shaft 206 is shifted axially by engagement with the cam 213 it imparts a corresponding transverse movement to the cutter roller 190 along its shaft 191 so that rotation of the shaft 206 imparts rotation to the cam 213 which in turn imparts axial movement to the shaft 206 and the drive roller 205 secured thereto. This movement of the drive roller 205 imparts rotation to the cutting block 190 and also causes the block to be shifted axially along the shaft 191 with the drive roller 205, so that at each operation of the cutter 4, a different area of the cutting block 190 will be exposed to the cutting action of the blade as it cuts through the lowermost card 12 of the stack. As the cutter 4 is pressed downwardly against the stack of cards, during its cutting stroke, the cutting block 190 is pressed downwardly to seat against the stop rods 194, thereby holding the cutting block against rotation during the cutting action. The coil spring cable 207 slips over one or the other of the drive pulleys, or the drive roller 205 slips on the cutting block 190 during the period the cutting block 190 is held against rotation.

The cutter 4 and the actuating and control mechanism therefore is substantially entirely enclosed within the main frame housing 1 and cover 3, only the V-shaped rib of the cutting element 4 being exposed through the slot in the front shield plate 7. A cowl 218 projects forwardly from the cover housing 3 to overhang the cutter blade 4 and additionally shield the cutter from engagement by external objects or by the hands of a workman. Preferably a pair of lighting elements 219 are mounted upon a bracket 220 in back of the cowl for illuminating the area immediately under the cutting element. The lighting elements are connected into the power circuit for the machine through connections 221 suitably attached to the buss bar 101 upon which the terminals for the power circuit are attached.

In operation, a stack of cards 12, such as illustrated in Figs. 1, 2 and 3 of the drawings, is placed upon the carriage 14 with the aligning pin 126 extending upwardly through aligned apertures 132 on one side of the stack of cards other than the side to be grooved. With the cards so held in accurately registering relation, the stack is moved bodily to abut the front closure plate 7 with the edge to be grooved supported on the crossbar 166. The carriage 14 is then moved to right or left as required to position the stack with a desired aperture 132 aligned with the cutting element 4. Approximate alignment is effected by the operator by manually moving the carriage to approximate alignment. With the cards thus positioned, the hand lever 41 is pressed downwardly to set the power driven mechanism into operation.

During the initial movement of the hand lever 41, the aligning finger 147 is moved into engagement with the aligning comb 133 for moving the carriage to position the cards in exact alignment with the cutter. At the same time, the cutter 4 is moved to rest against the top of the stack. Slight extra movement causes the detent 54 to be moved out of the path of the detent pin 53, thereby permitting the clutch drum to transmit rotation from the gear 29 to the cam shaft 32. Rotation of the cam shaft 32 causes the cam 34 to actuate the cutter arm 37 and force the cutter downwardly through the stack of cards to cut a groove in the edge of the stack opening into a selected coding aperture 132 of the card.

As the cutting stroke is completed, the hand lever 41 is released for return to its starting position, and the stop 54 moves back into the path of the pin 53. This halts the operation until the hand lever 41 is returned to a point where the arm 81 causes the wire 73 to reset the rocker arm 67 and link 62 in their operative engaging relation. This necessitates a return of the hand lever 41 to its starting position, and prevents continued operation of the cutter 4 in the event the lever is inadvertently held down by the operator, or other cause. At the end of the cutting stroke, the arm 54 stops the rotation of the cam shaft 32 by disengaging the clutch. The cam 102 prevents rebound and centers the flats of member 33a relative to the cam rolls 33b so as to prevent chattering of the cam and rolls.

The stack of cards is then shifted to move the next coding aperture, to which a groove is to be cut, into alignment with the cutter 4. If the next point is on the same side of the card, the carriage is moved to right or left as required. If the point to be grooved is on another edge of the card, the stack is moved bodily about the aligning pin 126, to present a desired edge to the cutter, or the stack may be removed bodily from the aligning pin 126 and replaced with the aligning pin extending through a different aperture on another edge of the stack of cards. The operation is, of course, repeated as many times as necessary to effect a desired coding of the cards in accordance with a general classification common to large groups of cards. In the embodiment illustrated, as many as 150 cards can be readily grooved at selected points along selected edges at one time. The movement of the carriage 14, and the aligning pin 126 facilitates the placing and holding of cards in accurate registration, and insures an accurate positioning of the cards for each grooving operation.

The machine is disconnected from the source of power when not in use. This causes the solenoid actuated safety arm 91 to move and hold the link 62 out of engagement with the pin 66, and thereby prevents operation or relative movement of the parts while the machine is disconnected from the source of power.

Having thus described my invention, what I claim as new and desire to secure by Letters Patent is:

1. A machine for grooving cards for classification comprising a cutter, a carriage mounted for transverse movement below and in front of said cutter and adapted to be manually moved to an approximate aligned position with respect to said cutter, actuating means for operating said cutter, and means operatively associated with said cutter actuating means for automatically moving said carriage into an exact aligned position with respect to said cutter in response to the actuation of said cutter actuating means to operate said cutter.

2. A machine for grooving cards for classification comprising a base frame, a cutter mounted for cutting movement upon base frame, a carriage mounted on said base frame for movement transverse to said cutter movement, said carriage being mounted in front of said cutter for supporting a stack of cards to be grooved by said cutter, said carriage being adapted to be manually moved so that a desired position of the carriage is in approximate alignment with the path of said cutter movement, power drive means for actuating said cutter, manually controlled means for effecting driving engagement of said power drive means with said cutter, and means actuated by said manually controlled means as said manually controlled means is operated to effect driving engagement of said power drive means with said cutter for automatically locking said carriage so that the desired carriage position is in exact alignment with respect to the path of said cutter movement.

3. In a device as set forth in claim 2, further including means to delay driving engagement of said cutter until said carriage is in the exactly aligned position with respect to the path of said cutter.

4. In a device as set forth in claim 2, further including an aligning device mounted on said carriage adapted to position the stack of cards in registering relation and in alignment with the cutter for grooving.

5. A machine for grooving cards for classification comprising a base frame, a cutter mounted upon said base frame for cutting movement, a carriage mounted on said base frame for movement transverse to said cutter movement, aligning means mounted on said carriage adapted to position a stack of cards having a series of coding holes spaced along the cards so that the cards are in registering relation and in alignment with the cutter for grooving, said carriage being adapted to be manually moved so that a preselected hole in a supported card is in approximate alignment with said cutter, power drive means for actuating said cutter, manually controlled means for effecting driving engagement of said power drive means with said cutter, a comb attached to said carriage and having teeth spaced to conform to the spacing of the coding holes of the said cards, said comb having slots formed between said teeth, a locking finger of a width conforming to said slots movable into and out of said slots for locking the carriage so that the preselected card hole is in exact aligned relation to said cutter, and means for actuating said locking finger in response to the opeartion of said manually controlled means as said manually controlled means is operated to effect driving engagement of said power drive means with said cutter.

6. A device as set forth in claim 5 wherein said comb teeth are provided with pointed ends, said slots are relatively narrow with respect to the spacing of said comb teeth, and said comb teeth are provided with inclined guide faces extending from said teeth points to said slots.

7. A machine for grooving cards for classification comprising a base frame, a cutter mounted upon said base frame for cutting movement, a carriage mounted on said base frame for movement transverse to said cutter movement, aligning means mounted on said carriage adapted to position a stack of cards having a series of coding holes spaced along the cards so that the cards are in registering relation and in alignment with the cutter for grooving, said carriage being adapted to be manually moved so that a preselected hole in a supported card is in approximate alignment with said cutter, power drive means for actuating said cutter, manually controlled means for effecting driving engagement of said power drive means with said cutter, a comb attached to said carriage and having teeth spaced to conform to the spacing of the coding holes of the said cards, said comb having slots formed between said teeth, a locking finger of a width conforming to said slots movable into and out of said slots for locking the carriage so that the preselected card hole is in an exact aligned relation to said cutter, and means operable in response to actuation of said manually controlled means to effect driving engagement of said power drive means with said cutter for actuating said locking finger to lock said carriage before said cutter is operated.

References Cited in the file of this patent

UNITED STATES PATENTS

| | | |
|---|---|---|
| 380,614 | Whitelaw | Apr. 3, 1888 |
| 725,139 | Reynolds | Apr. 14, 1903 |
| 1,149,151 | Birkenmaier | Aug. 3, 1915 |
| 1,195,972 | Bryce | Aug. 29, 1916 |
| 2,271,019 | DeMattia | Jan. 27, 1942 |
| 2,289,076 | Ryan | July 7, 1942 |
| 2,342,516 | Nevin | Feb. 22, 1944 |
| 2,414,547 | Nevin | Jan. 21, 1947 |
| 2,536,213 | Plotts | Jan. 2, 1951 |
| 2,576,221 | Bone | Nov. 27, 1951 |
| 2,611,433 | Rembold | Sept. 23, 1952 |
| 2,620,874 | Chase | Dec. 9, 1952 |
| 2,698,053 | Mantonya | Dec. 28, 1954 |
| 2,708,971 | Maul | May 24, 1955 |